United States Patent Office 3,313,765
Patented Apr. 11, 1967

3,313,765
POLYMERS CONTAINING OXYMETHYLENE
AND THIOMETHYLENE UNITS
William J. Roberts, Bernardsville, N.J., and Burton B.
Jacknow, Rochester, N.Y., assignors to Celanese Corporation, a corporation of Delaware
No Drawing. Filed May 10, 1963, Ser. No. 279,603
10 Claims. (Cl. 260—45.8)

This is a continuation-in-part of application Ser. No. 159,168, filed Dec. 13, 1961, now abandoned.

This invention relates to oxymethylene copolymers.

It is an object of this invention to provide novel oxymethylene copolymers of improved thermal stability.

Other objects of this invention will be apparent from the following detailed description and claims. In the following description and claims all proportions are by weight unless otherwise specified.

Oxymethylene polymers, having recurring —$CH_2O$— units have been known for many years. They may be prepared by polymerizing a source of oxymethylene units such as anhydrous formaldehyde or trioxane, a cyclic trimer of formaldehyde.

High molecular weight solid polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in Patent No. 2,989,506 of Donald E. Hudgin and Frank M. Berardinelli. Boron fluoride gas is also a rapid and effective catalyst, as disclosed in Patent No. 2,989,507 of Hudgin and Berardinelli.

Oxymethylene polymers of improved thermal stability may be prepared by introducing into the polymer chains or attaching to the ends of the polymer chains, structures which are resistant to thermal detachment. The polymers may incorporate interspersed oxyalkylene units with adjacent carbon atoms, and preferably oxyethylene units as disclosed in Patent No. 3,027,352 of Walling, Brown and Bartz. Copolymers of this type may be described as having at least one chain containing oxymethylene (—$OCH_2$—) units (usually at least 85 mol percent) interspersed with —O—R— units wherein R is a divalent radical containing at least two carbon atoms directly linked to each other and positioned in the chain between the two valences, with any substitutent in the R radical being inert.

Specific interspersed monomeric units which may be incorporated are those derived from lactones, carbonates, cyclic acid anhydrides or ethylenically unsaturated compounds, such as styrene, divinyl ether, vinyl acetate, vinyl methyl ketone or acrolein as disclosed in the article by Kern et al. in Angewandte Chemie, 73(6), pages 177 to 186 (Mar. 21, 1961). The polymers may be end capped by acylation or etherification after polymerization or during polymerization by the use of selected chain transfer agents.

It has now been found that such oxymethylene polymers can be prepared, containing recurring or repeating oxymethylene units and at least one

unit. Preferably, the

unit is thiomethylene, and the molar ratio of oxymethylene to thiomethylene units is at least about 1:1, for example, within the range of 1:1 to 1000:1 or more. One suitable method of making copolymers of this type is by the reaction of trioxane and trithiane in the presence of a catalyst for the polymerization of trioxane. Such catalysts, and the proportions in which they are to be used, are well known to the art; see, for example, Hudgin and Berardinelli, U.S. Patent No. 2,989,509, of June 20, 1961, column 3, lines 10-43, and Schnizer, U.S. Patent No. 2,989,511 of June 20, 1961. The copolymerization reaction may be carried out under the conditions used for the polymerization of trioxane, which conditions are likewise well known to the art; see, for example, Hudgin and Berardinelli, U.S. Patents 2,989,505, 2,989,506, 2,989,507, 2,989,508, 2,989,509, Bruni, U.S. Patent No. 2,989,510 and the aforementioned Schnizer patent. It is understood that the copolymers of the invention may also be prepared by the reaction of any suitable source of oxymethylene units such as anhydrous formaldehyde, with any suitable source of thiomethylene units, such as trithiane.

The following examples illustrate this invention further.

*Example I*

200 parts of trioxane, 6 parts of trithiane and 190 parts of benzene were heated to 62–63° C. and stirred to effect solution. 0.031 part of $BF_3$ di(n-butyl) ether complex in 10 parts of benzene were added to the solution which was stirred continuously and maintained at 62–63° C. for 22 hours. Polymerization started after an induction period of about one hour after the addition of the boron fluoride complex catalyst. At the beginning of polymerization the initially clear solution started to turn grey; shortly thereafter it became grey-white. As polymerization proceeded very white particles formed and the reaction mixture thickened and became creamy. The reaction was somewhat exothermic. The polymer was collected and washed, once with acetone containing 1% tributylamine and three times with acetone. The polymer was then dried at 75° C. for 20 hours in an air-circulating oven; 103 parts of polymer were obtained. The dried polymer was subjected to a Soxhlet extraction with benzene for three days. The resulting extracted polymer was thermoplastic; it had an inherent viscosity of 1.03 and a sulfur content of 0.18%, corresponding to a random copolymer in which there are long oxymethylene chains, derived from the trioxane, and thiomethylene units, derived from the trithiane, dispersed between the chains, with an oxymethylene:thiomethylene molar ratio of 592:1.

*Example II*

200 parts of trioxane, 14 parts of trithiane and 457 parts of ethylene dichloride were heated at 70° C. and stirred until a clear solution was obtained, after which 0.023 part of $BF_3$ dibutyl ether complex in 10 parts of ethylene dichloride was added. 20 minutes thereafter polymerization began. The mixture was maintained at 69–71° C. for 6 hours with stirring and at room temperature for 60 hours without stirring. The polymer was collected and washed once with acetone containing 1% tributylamine and three times with acetone, dried at 75° C. for 20 hours, and Soxhlet extracted with benzene for 3 days. The thermoplastic product contained 0.16% sulfur corresponding to a molar ratio of oxymethylene to thiomethylene of 666:1; its inherent viscosity was 0.44.

*Example III*

100 parts of trioxane, 15 parts of trithiane and 150 parts of orthodichlorobenezene were maintained at 110–112° C. with stirring until a clear solution was formed. Then 0.0192 part of $BF_3$ dibutyl ether complex in 1 part of the dichlorobenzene was added and stirring was continued at 110–112° C. Polymerization began after 5 minutes. After 2.5 hours the polymer was collected, washed, dried and Soxhlet extracted, as in Example II. The extracted thermoplastic polymer had an inherent viscosity of 0.55 and a sulfur content of 0.15%, corresponding to a molar ratio of oxymethylene to thiomethylene of 711:1.

Examples I to III have illustrated the copolymerization in a solvent for both the trioxane and the trithiane. In these examples, at the beginning of polymerization the initially clear solution started to turn grey; shortly thereafter it became grey-white. As polymerization proceeded very white particles formed and the reaction mixture thickened and became creamy. The reaction was somewhat exothermic.

The following examples illustrate copolymerization of the materials in molten condition. During these polymerizations, the liquid changed grey, then white; a heavy white cream formed and changed to a white solid.

Example IV 285 parts of trioxane and 15 parts of trithiane were heated to 110° C. with stirring to form a clear solution and then 0.023 part of the $BF_3.(C_4H_9)_2O$ catalyst of Examples I to III in 4.4 parts of chlorobenzene was added. Polymer formed immediately. The mixture was stirred at 104–106° C. for one hour. The solid polymer was collected, washed and dried as in Example II, and then Soxhlet extracted for 2 days with chlorobenzene to produce a thermoplastic product containing 0.15% sulfur corresponding to a molar ratio of oxymethylene to thiomethylene of 711:1; its inherent viscosity was 1.07.

Example V 100 parts trioxane and 10 parts trithiane were placed in a glass reaction tube and then 0.0078 part of the catalyst of Examples I–IV dissolved in 4.4 parts of chlorobenzene were added and the tube was immediately capped and placed in an oil bath maintained at 113–114° C. Polymerization was observed after 5 minutes. After 1.5 hours the polymer was collected and washed and dried as in Example II, then extracted three times with hot chlorobenzene at a temperature of 120–125° C. (each portion of this extractant being about 10 times the weight of the polymer) and then washed with acetone and dried at 100° C. under vacuum for 24 hours. The thermoplastic product contained 0.30% sulfur, corresponding to a molar ratio of oxymethylene to thiomethylene of 355:1; its inherent viscosity was 0.71. Before extraction with chlorobenzene the amount of polymer was 64 parts; after the extraction washing and drying the amount was 56 parts.

Example VI 120 parts of trioxane and 18 parts of trithiane were placed in a stainless steel reaction tube. A solution of 0.0218 part of the catalyst of the preceding examples in 1.4 parts of n-octane was added and the tube was immediately capped and placed in an oil bath maintained at 145–147° C. for seven hours; at this temperature the trioxane has a relatively high vapor pressure. The polymer was then collected and after-treated as in Example V. The product contained 0.36% sulfur corresponding to a molar ratio of oxymethylene to thiomethylene of 295:1; its inherent viscosity was 0.23.

Example VII

Example VI was repeated except that the amount of catalyst was doubled and the tube was maintained in the oil bath for only 3.5 hours. The product after extraction had an inherent viscosity of 0.22 and a sulfur content of 1.65%, corresponding to a molar ratio of oxymethylene to thiomethylene of 63:1.

Example VIII 120 parts of trioxane and 30 parts of trithiane were placed in a stainless steel reaction tube. A solution of 0.0117 part of the catalyst of the preceding examples in 1.8 parts of decahydronaphthalene was added and the tube was immediately capped and placed in an oil bath maintained at 166–168° C. for five hours. The polymer was worked up as in Example II, except that chlorobenzene at 132° C. was used in place of the benzene in the extraction. The thermoplastic product had an inherent viscosity of 0.09 and a sulfur content of 2.40%, corresponding to an oxymethylene to thiomethylene ratio of about 43:1.

The following example illustrates the copolymerization of trioxane and alpha trithioacetaldehyde (a trimer of thioacetaldehyde).

Example IX 120 parts of trioxane and 20 parts of alpha trithioacetaldehyde were heated to 100° C. in a flask under a nitrogen atmosphere, and 0.56 part of boron fluoride diethyl etherate diluted 1/100 with ethyl ether was added with stirring. Polymerization was observed after twenty minutes. After 3 hours, the polymer was collected and washed repeatedly with methanol and then extracted exhaustively with hot ethanol to remove any trioxane and trithioacetaldehyde. The white, thermoplastic polymer had a melting point of 166° C., and was insoluble in common organic solvents, such as benzene and methylene chloride. The product had an inherent viscosity of 0.17 and contained 1.85% sulfur, corresponding to a molar ratio of oxymethylene to methyl substituted thiomethylene of 56:1.

Example X

The rapidity of the thermal degradation of the copolymers of Examples III–IX was tested by heating these copolymers, alone or blended with stabilizers in the manner indicated below, to a temperature of 230° C. in a circulating air oven. The results are tabulated below. The "degradation rate" was determined by weighing the sample just before it was placed on an aluminum block in the oven and then 45 minutes thereafter and dividing the difference by 45, the resulting figure being expressed as percent per minute.

| Copolymer | Added Stabilizer | Method of Blending Stabilizer | "Degradation Rate," percent/min. |
|---|---|---|---|
| (a) Product of Example III | None | | 1.05 |
| (b) Product of Example III | 1% phenolic antioxidant,[1] 0.3% cyanoguanidine. | Dry blending of powders | 0.89 |
| (c) Product of Example IV | None | | 0.61 |
| (d) Product of Example IV | Same as (b) | Dry blending of powders | 0.54 |
| (e) Product of Example V milled in a sigma blade mixer at 200° C. for 45 minutes during which it lost 15% of its weight. | None | | 0.66 |
| (f) Product of Example V | Same as (b) | Dry blending followed by milling in a sigma blade mixer at 200° C. for 45 minutes during which the weight loss was 14%. | 0.33 |
| (g) Product of Example VI | 1% phenolic antioxidant,[1] 1% epoxide stabilizer.[2] | Same as (f); during milling 10% of the polymer was lost by decomposition. | 0.32 |

See footnotes at end of table.

| Copolymer | Added Stabilizer | Method of Blending Stabilizer | "Degradation Rate," percent/min. |
|---|---|---|---|
| (h) Product of Example VII | Same as (g) | Same as (g) | 0.27 |
| (i) Product of Example VIII | do | do | 0.09 |
| (j) Product of Example IX | .5% phenolic antioxidant,[1] .1% cyanoguanidine. | Dry blending | 0.36 |
| (k) Trioxane homopolymer of inherent viscosity 2.0. | None | | 2.2 |
| (l) Trioxane homopolymer of item k. | Same as (b) | Dry blending of powders | 1.34 |
| (m) Trioxane homopolymer of item k. | do | Dry blending followed by milling in sigma blade mixer at 215° C. for 30 min., weight loss 74%. | 0.59 |
| (n) Trioxane homopolymer of item k. | Same as (b) +1% trithiane | Same as (l), weight loss 75% | 0.53 |
| (o) Trioxane homopolymer of item k. | Same as (b) +3% trithiane | Same as (l), weight loss 74% | 0.51 |
| (p) Trioxane homopolymer of inherent viscosity of 1.2 milled as in (e), during which the weight loss was 39%. | None | | 1.07 |
| (q) Trioxane homopolymer of inherent viscosity 1.2. | Same as (b) | Same as (f), weight loss 41% | 0.50 |
| (r) Trioxane homopolymer of item j. | Same as (b) +1% trithiane | Same as (f), weight loss 76% | 0.64 |

[1] The phenolic antioxident was 2,2'-bis(4-methyl-6-t-butyl phenol) methane.
[2] The epoxide stabilizer was Unox-201; 3,4-epoxy-6 methyl-cyclohexylmethyl-3-4-epoxy-6-methylcyclohexane carboxylate.

In the above examples, the Soxhlet extractions were carried out in conventional manner, at atmospheric pressure, so that during the extraction the polymer was at a temperature just below the boiling point of the solvent used for the extraction.

In the above examples "inherent viscosity" is determined in p-chlorophenol containing 2% α-pinene at 0.1% concentration at 60° C.; it is expressed in deciliters per gram.

In the above examples the trithiane was purified by recrystallization from chlorobenzene, according to the following procedure. A hot 5.7% solution of the trithiane in the chlorobenzene is refluxed for 3 hours and flash distilled at atmospheric pressure and a pot temperature of 136° C. to remove 23% of the solvent. The solution is then filtered hot (125–130° C.) and the precipitated trithiane is recovered by filtration followed by washing with cold chlorobenzene and drying at 100° C. in vacuum oven (¼ atm.) for 30 hours to constant weight.

The copolymer may be aftertreated in any convenient manner. Thus the catalyst may be deactivated in the manner described in Hudgin and Berardinelli U.S. Patent No. 2,989,509.

In Examples I–V a commercial trithiane was the starting material, before purification. In Examples VI, VII and VIII the trithiane was synthesized by bubbling $H_2S$ gas through a mixture of formalin and concentrated HCl; the white precipitate of trithiane, obtained in quantitative yield, was washed with distilled water until there was no longer any evidence of chlorine (as confirmed with $AgNO_3$ solution), dried 12 hours in an oven at 75° C., and then purified with chlorobenzene as described above. The trithioacetaldehyde was prepared from acetaldehyde and hydrogen sulfide.

While the above examples have dealt with two component copolymers, it will be understood that it is also within the scope of this invention to make polymers with more than two components. The other added comonomers are preferably such as to yield —C—C— bonds in the copolymer (e.g., 1.3-dioxolane or ethylene oxide or any other comonomers described in the section on copolymerization of trioxane in the article by Kern et al. on polyoxymethylene, which appeared in Angewandte Chemie 73(6), 177–186). The proportion of the additional comonomer may be varied, but it is advantageous that it be less than 20% (in the reaction mixture and in the final terpolymer); one suitable range of proportions is 0.1–10%, preferably in the range of about ½–5%, e.g., 2%. The added comonomer may be incorporated, for example, in the molten trioxane prior to the addition of the catalyst.

As illustrated in Example X above, stabilizers may be added to the copolymer to improve its resistance to thermal degradation. Phenolic antioxidants, particularly polynuclear polyhydric phenols, such as bisphenols, are effective. Other stabilizers are epoxy compounds, particular polyepoxides, carboxylic amides, such as linear superpolyamides, and imides or imines such as cyanoguanidine; these are desirably used in combination with the phenolic antioxidant.

The stability of the copolymer may also be increased by subjecting it to a heat treatment, e.g., at a temperature above the melting point of the copolymer, to decompose a portion, e.g., 5 to 20% of the copolymer. During this heat treatment, the copolymer is advantageously malaxated, as by milling on hot rolls, to expose fresh surfaces of the copolymer to the atmosphere. This heat treatment splits off the less stable oxymethylene end groups of the copolymer until a thiomethylene group is reached. This new end group is more stable and blocks further splitting. Such thermal degradation is also useful where oxymethylene terpolymers containing —C—C— bonds are utilized. The copolymers may also be stabilized by hydrolysis as disclosed in application Ser. No. 23,658 filed by Berardinelli on Apr. 21, 1960, now abandoned.

The copolymers of this invention may be used for the manufacture of shaped articles as by compression or injection molding. For example, a disk 110 mils thick may be produced by compression molding at 190° C. and 650 p.s.i. for 5 minutes. The copolymers may be formed into fibers by melt spinning.

While the foregoing description has dealt primarily with copolymers made from trithiane, per se, it is also within the scope of this invention to make copolymers, containing substituted thiomethylene groups, from substituted trithianes (e.g., leaving aryl or alkyl substituents). Examples of such substituted trithianes are trimer of thioacetaldehyde, trimer of thioacetone, trimer of thiobenzaldehyde, trimer of thiopropionaldehyde, trimer of thioacetophenone, trimer of thiobenzophenone, trimer of thiomethylethyl-ketone. Suitable substituents include, for example, hydrogen, a lower alkyl having 1–10 carbon atoms, a halogen (e.g., fluorine, chlorine, bromine, iodine), or any other substituent which is inert (i.e., does not enter into any substantial undesirable side reactions).

It is to be understood that the foregoing detailed description is given merely by way of illustration and that many variations may be made therein without departing from the spirit of our invention.

Having described our invention what we desire to secure by Letters Patent is:

1. A normally solid copolymer consisting essentially of (A) oxymethylene units and (B) recurring divalent units of the formula

in which the R substituents on the carbon atom are selected from the group consisting of hydrogen, a lower alkyl having 1–10 carbon atoms, a halogen and phenyl, with the ratio of said (A) units to said (B) units being in the range of about 1:1 to 1000:1.

2. A stabilized composition of the copolymer of claim 1 and a stabilizing amount of a phenolic antioxidant.

3. The stabilized composition of claim 2, also comprising a stabilizing amount of a polyepoxide.

4. The stabilized composition of claim 3 wherein said polyepoxide stabilizer is 3,4-epoxy-6-methyl-cyclohexyl-methyl-3,4-epoxy-6-methylcyclohexene carboxylate and said phenolic antioxidant is 2,2'-bis(4-methyl-6-t-butyl phenol) methane.

5. The stabilized composition of claim 2, also, comprising a stabilizing amount of an amidine compound.

6. The stabilized composition of claim 5 wherein said phenol antioxidant is 2,2'-bis(4-methyl-6-t-butyl phenol) methane and said amidine is cyanoguanidine.

7. A normally solid copolymer consisting essentially of (A) oxymethylene units and (B) thiomethylene units, with the ratio of said (A) units to said (B) units being in the range of about 1:1 to 1000:1.

8. A copolymer as set forth in claim 7 which is a thermoplastic random addition copolymer containing less than 20% of oxyalkylene units having two carbon atoms directly linked to each other.

9. A copolymer consisting essentially of (A) oxymethylene units and (B) thiomethylene units, with the ratio of said (A) units to said (B) units being in the range of about 1:1 to 1000:1, and more than 80% of the carbon atoms in the polymeric chain being isolated carbon atoms, which are not directly linked in the chain to other carbon atoms.

10. A copolymer of trioxane and trithioacetaldehyde in which the ratio of oxymethylene units to thioacetaldehyde units is in the range of about 1:1 to 1000:1.

References Cited by the Examiner

UNITED STATES PATENTS

| | | | |
|---|---|---|---|
| 2,199,361 | 4/1940 | Lincoln et al. | 260—67 |
| 2,363,616 | 11/1944 | Patrick | 260—67 |
| 2,385,661 | 9/1945 | Vaala et al. | 260—2 |
| 2,454,635 | 11/1948 | Curtis et al. | 260—67 |
| 2,457,224 | 12/1948 | Gresham | 260—67 |
| 2,657,198 | 10/1953 | Davis | 260—79.1 |
| 3,010,937 | 11/1961 | Roos et al. | 260—45.7 |
| 3,027,352 | 3/1962 | Walling et al. | 260—67 |
| 3,047,545 | 7/1962 | Harris | 260—67 |
| 3,070,580 | 12/1962 | Harmon | 260—79 |
| 3,116,267 | 12/1963 | Dolce | 260—45.9 |
| 3,210,318 | 10/1965 | Dolce et al. | 260—67 |
| 3,218,300 | 11/1965 | Kullmar et al. | 260—79 |

FOREIGN PATENTS 1,365,087  5/1964  France.

OTHER REFERENCES

Walker: Formaldehyde (2nd ed., 1953), Reinhold, pp. 170, 191–193.

Kunststoffe: Vol. 53, July 1963, pp. 424–436 (see English translation ibid, pp. 11–21).

Gipstein et al.: Journ. Polymer Science, vol. 1, pt. B, 1963, pp. 237–239.

Walker: Formaldehyde, ACS Monograph Series, p. 192 (1953).

Lal: Journ. Organic Chemistry, 26, March 1961, pp. 971–972.

SAMUEL H. BLECH, *Primary Examiner.*

WILLIAM H. SHORT, LOUISE P. QUAST, *Examiners.*

L. M. PHYNES, *Assistant Examiner.*